Aug. 26, 1924.
J. C. McCUNE
VARIABLE LOAD BRAKE
Filed Oct. 19, 1923
1,506,020
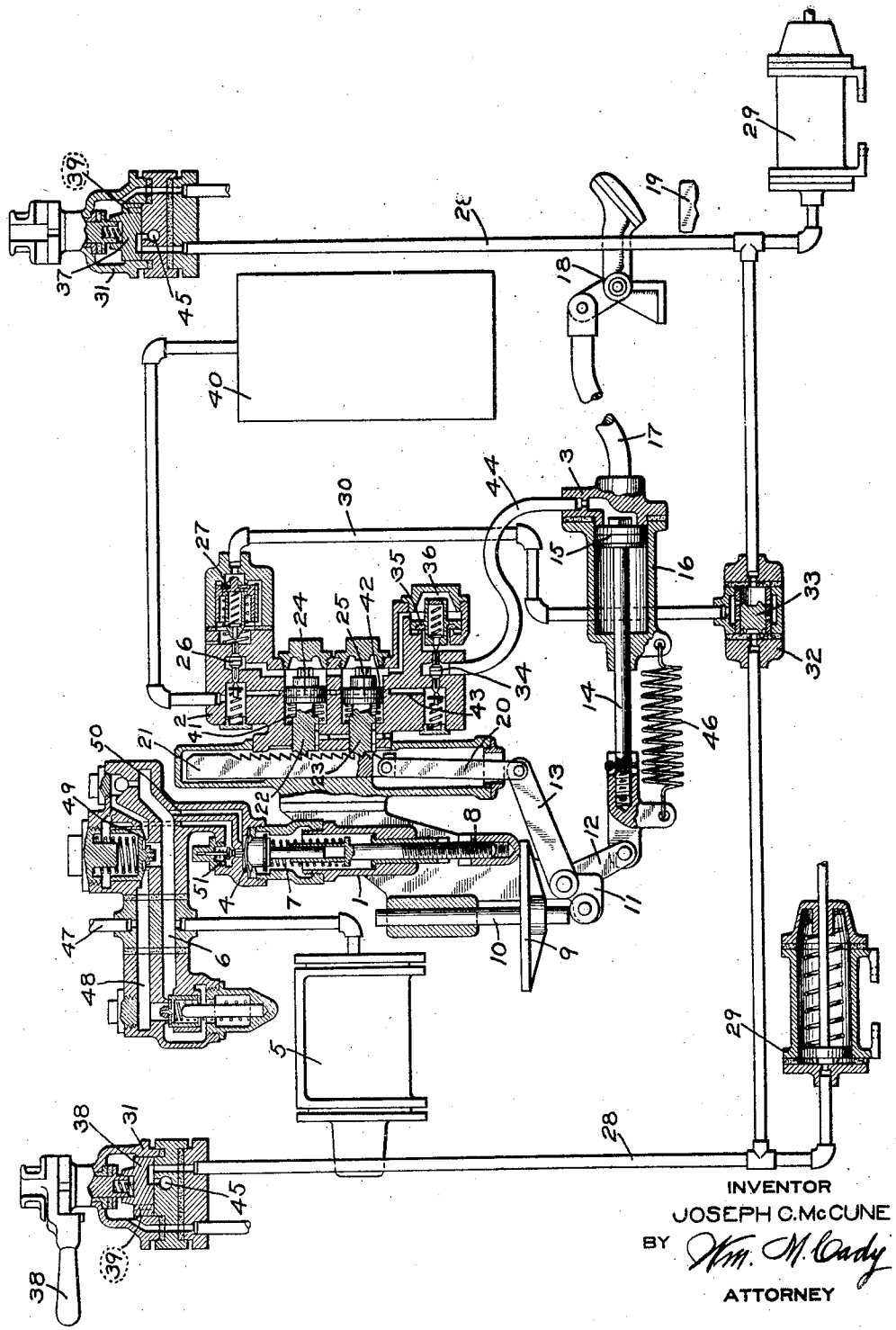
INVENTOR
JOSEPH C. McCUNE
BY *Wm. M. Cady*
ATTORNEY Patented Aug. 26, 1924.

1,506,020

UNITED STATES PATENT OFFICE.

JOSEPH C. McCUNE, OF ORANGE, NEW JERSEY, ASSIGNOR TO THE WESTINGHOUSE AIR BRAKE COMPANY, OF WILMERDING, PENNSYLVANIA, A CORPORATION OF PENNSYLVANIA.

VARIABLE-LOAD BRAKE.

Application filed October 19, 1923. Serial No. 669,491.

*To all whom it may concern:*

Be it known that I, JOSEPH C. McCUNE, a citizen of the United States, residing at Orange, in the county of Essex and State of New Jersey, have invented new and useful Improvements in Variable-Load Brakes, of which the following is a specification.

This invention relates to fluid pressure brakes, and more particularly to a brake equipment in which the braking power is regulated according to the load on the car.

The principal object of my invention is to provide a load brake equipment in which the operation is controlled by fluid under pressure employed in operating the car doors.

In the accompanying drawing, the single figure is a diagrammatic view, partly in section, of a variable load brake equipment embodying my invention.

As shown in the drawing, the equipment may comprise a brake cylinder pressure limiting valve device 1, a locking mechanism 2, and a strut cylinder mechanism 3.

The valve device 1 may comprise a flexible diaphragm 4, subject on one side to pressure in the brake cylinder 5, as supplied from chamber 6, and subject on the opposite side to the pressure of an adjustable coil spring 7. The adjustment of spring 7 is effected by the movement of a plunger 8, the lower end of which is adapted to engage a plate 9 which is carried by a sliding rod 10.

Pivotally mounted adjacent to plate 9 is a crank arm member having crank arms 11, 12, and 13, the arm 11 being adapted to engage the lower end of the rod 10. The arm 12 is pivotally connected to a piston rod 14 having a piston head 15 which is adapted to work in a cylinder 16. The cylinder 16 is connected to a strut member 17 having its outer end pivotally connected to a bell crank lever 18. One arm of the bell crank 18 is adapted to engage an operating member 19 which is carried by the car truck, while the bell crank is mounted on the car body, so that there is a relative movement between the bell crank 18 and the member 19 according to the compression of the car springs under load.

The crank arm 13 is connected through a link 20 with a ratchet bar 21, the teeth of which are engageable by pawls 22 and 23 carried respectively by pistons 24 and 25.

The piston chambers containing pistons 24 and 25 are connected together and the admission and release of fluid under pressure to and from said pistons is controlled by a double beat valve 26. A piston 27 is provided for operating the double beat valve 26 and according to my invention, fluid for operating said piston is supplied when the car doors are operated.

For this purpose pipe 28, through which fluid under pressure is supplied to door engine 29 for operating the door engine to effect the opening of the car door, is connected to the piston 27 through a pipe 30. If the equipment is applied to a double end car having a door control valve 31 at each end of the car, a double check valve device 32 may be interposed between the door pipes 28 at each end of the car and the variable load pipe 30. The device 32 contains a double check valve 33 adapted to cut off communication from the door control pipe 28 at one end of the car when fluid is supplied to the pipe 28 at the other end of the car. With a single end equipment, it would not, of course, be necessary to provide a double check valve.

In order to control the operation of piston 15, a double beat valve 34 is provided which is adapted to be operated by a piston 35. The piston chamber 36 of said piston is in open communication with the piston chamber of the piston 25, so that when fluid under pressure is supplied to pistons 24 and 25, it is also supplied to piston 35.

In operation, when a car equipped with the above described apparatus is brought to a stop and a car door is opened, for example, by manipulating the controlling valve 31 at the right of the drawing, the rotary valve 37 is turned by handle 38, so that a port 39 establishes communication for supplying fluid under pressure to pipe 28. The corresponding door engine 29 is then operated to open the car door and at the same time, fluid is supplied to the double check valve 33, which is then shifted to the left, so as to establish communication from pipe 28, at the right, to pipe 30. Fluid supplied to pipe 30 operates piston 27 and thereby the double beat valve 26 so as to cut off communication from a source of fluid supply 40 to pistons 24 and 25 and open communication from said pistons to the atmosphere. The pistons 24 and 25 are ther operated by springs 41 and 42 so as to shift the pawls 22 and 23 out of locking engagement with the teeth of the ratchet bar 21 and consequently the bar 21 is now free to move vertically.

When fluid under pressure is vented from pistons 24 and 25, it is also vented from piston 35, so that said piston will be shifted toward the right, permitting the double beat valve 34 to move so that communication from piston 15 to the atmosphere is cut off while communication is established from the reservoir 40 through passage 43 and flexible hose 44 to piston 15. The admission of fluid under pressure to piston 15 causes movement of the cylinder 16 and rod 17 toward the right and thereby the bell crank 18 is rotated so that one arm engages the member 19.

If the load on the car is increased by passengers entering the car the relative vertical movement between the bell crank 18 and the member 19 produced by movement of the car body relative to the car truck, will cause a corresponding movement of the rod 17 toward the left, but as piston 15 is now maintained at its extreme left hand position by fluid pressure supplied to cylinder 16, this movement of rod 17 toward the left also effects a corresponding movement of the piston rod 14, so that the crank arm 12 is rotated in a clockwise direction. The crank arm 11 is thus rotated in the same direction, causing an upward vertical movement of rod 10 and plate 9. The upward movement of plate 9 is transmitted to the plunger 8 which then operates to compress the spring 7, so as to increase the spring pressure on diaphragm 4.

If the load on the car is reduced by passengers leaving the car, the bell crank 18 will move in a clockwise direction, so that the rod 17 will move toward the right, causing a movement of piston rod 14 toward the right and a counter-clockwise movement of the crank arm 12. The crank arm 11 is also rotated in a counter-clockwise direction, so that rod 10 is permitted to move downwardly and with it, the plate 9 and the plunger 8. The downward movement of the plunger 8 then reduces the compression of spring 7 and the spring pressure on the diaphragm 4.

Any movement of the crank arm 12 also effects a corresponding movement of the crank arm 13, so that ratchet bar 21 is shifted accordingly. When the car is about to start, the car door is first closed by operating the controlling valve 31, so as to connect pipe 28 with exhaust port 45 and fluid under pressure is then released from the door engine 29, so that said engine operates to effect the closing of the car door. At the same time, fluid is vented from pipe 30 and the face of piston 27, so that said piston is shifted to its outer position, as shown in the drawing. The double beat valve 26 is operated by this movement of the piston so as to cut off communication from pistons 24 and 25 to the atmosphere and open communication from reservoir 40 to said pistons.

The pistons 24 and 25 are then shifted toward the left, causing the pawls 22 and 23 to engage the teeth of the ratchet bar 21, so as to lock said bar in its adjusted position and consequently the plunger 8 is locked in its adjusted position corresponding with the load on the car.

Fluid is also supplied to piston 35, so that said piston is shifted to its left hand position, as shown in the drawing, the double beat valve 34 being shifted, so that communication from the reservoir 40 to piston 15 is cut off, while communication is established from said piston to the atmosphere. The release of fluid from cylinder 16 then permits spring 46 to retract the cylinder to the position shown in the drawing, so that rod 17 shifts the bell crank 18 out of engagement with the member 19. It will thus be seen that while the car is running, the adjusting mechanism is not affected by any relative movement between the car body and the car truck.

If the brakes are applied, fluid under pressure is supplied to pipe 47 by the operation of the usual apparatus employed in effecting an application of the brakes. Fluid supplied to pipe 47 flows into chamber 48 and acts on the exposed area of a valve piston 49, so as to cause said valve piston to lift from its seat. Fluid is then supplied to chamber 6 and thence to the brake cylinder 5. Fluid supplied to chamber 6 also flows through passage 50 to the diaphragm 4 and when the pressure in the brake cylinder has been increased to a predetermined degree, corresponding with the previous adjustment of the spring 7 in the manner hereinbefore described, the diaphragm 4 will be shifted so as to permit valve 51 to close. Any further increase in pressure in chamber 48 then acts on the spring side of valve piston 49 and since such increase in pressure cannot equalize on the valve piston 49, due to the closure of valve 51, said valve piston 49 will be shifted to its seated position, cutting off the further supply of fluid to the brake cylinder.

Having now described my invention, what I claim as new and desire to secure by Letters Patent, is:—

1. In a variable load brake, the combination with means for adjusting the braking power according to the load on the car, of fluid pressure operated locking mechanism for locking said means in its adjusted position, a fluid pressure operated mechanism for connecting up said adjusting means for control according to the load on the car, means including a piston for controlling the fluid pressure for operating said locking mechanism and said connecting mechanism, and fluid pressure means for controlling a car door, said piston being operated by fluid pressure supplied to said car door controlling means.

2. In a variable load brake, the combination with means for adjusting the braking power according to the load on the car, of fluid pressure operated locking mechanism for locking said means in its adjusted position including a piston, a fluid pressure operated mechanism for operatively connecting said adjusting means so as to be controlled by the load on the car, valve means for controlling the fluid pressure for operating said connecting mechanism, a piston for operating said valve means, valve means for controlling the fluid pressure on both of the aforesaid pistons, and a piston for operating said valve means.

3. In a variable load brake, the combination with means for adjusting the braking power according to the load on the car, of fluid pressure operated locking mechanism for locking said means in its adjusted position including a piston, a fluid pressure operated mechanism for operatively connecting said adjusting means so as to be controlled by the load on the car, valve means for controlling the fluid pressure for operating said connecting mechanism, a piston for operating said valve means, valve means for controlling the fluid pressure on both of the aforesaid pistons, a piston for operating said valve means, and a door engine operated by variations in fluid pressure for controlling a car door, the last mentioned piston being subject to and operated by variations in fluid pressure on said door engine.

In testimony whereof I have hereunto set my hand.

JOSEPH C. McCUNE.